US008672488B2

(12) United States Patent
Pedersen et al.

(10) Patent No.: US 8,672,488 B2
(45) Date of Patent: Mar. 18, 2014

(54) PACKAGE FOR A PROJECTOR

(75) Inventors: Bradley D. Pedersen, Mississauga (CA); Kyle Jeffs, Mississauga (CA)

(73) Assignee: Tech 4 Kids, Inc., Mississauga (CA)

( * ) Notice: Subject to any disclaimer, the term of this patent is extended or adjusted under 35 U.S.C. 154(b) by 351 days.

(21) Appl. No.: 12/897,762

(22) Filed: Oct. 4, 2010

(65) Prior Publication Data

US 2012/0081680 A1    Apr. 5, 2012

(51) Int. Cl.
*G03B 21/14*    (2006.01)
(52) U.S. Cl.
USPC ............ 353/101; 353/100; 353/122; 206/736
(58) Field of Classification Search
USPC ............................ 353/101, 100, 122; 206/736
See application file for complete search history.

(56) References Cited

U.S. PATENT DOCUMENTS 1,659,734 A * 2/1928 Hurley ........................... 359/614
7,025,466 B2 * 4/2006 Hoffmeister et al. ......... 353/119
2004/0017548 A1 * 1/2004 Denmeade ...................... 353/31
2005/0151934 A1 * 7/2005 Akutsu ........................... 353/69
2008/0186455 A1 * 8/2008 Meier ............................. 353/85

OTHER PUBLICATIONS

Web Page: http://www.toycrazy.com.au/index.php?main_page=product_info&products_id=1001.*
Web Page: http://www.youtube.com/watch?v=ntlWOvOv0-A; time: 0:27, upload date Mar. 14, 2010.*

* cited by examiner

*Primary Examiner* — Francis M Legasse, Jr.
*Assistant Examiner* — Jerry Brooks
(74) *Attorney, Agent, or Firm* — Adam K. Sacharoff

(57) ABSTRACT

A packaging product for projectors is described, wherein the package contains a projector which has been preloaded with program material for projection, and wherein a prospective purchaser of the projector may see a preview of the program material which is contained in the projector. The controls for the projector are available within an opening in the package, and a visible light reflective surface is provided to view the projected image. In this manner, the prospective purchaser will obtain an idea of the nature of the program material contained within the projector, as well as being able to determine the functionality of the projector and, to a greater or lesser extent, the quality of the projection.

12 Claims, 3 Drawing Sheets

PACKAGE FOR A PROJECTOR

FIELD OF THE INVENTION

This invention relates to packaging for projectors, wherein the package contains a projector such as, for example, an image or film projector, toy projectors, electronic digital projectors, or the like, which can be preloaded with a sample program material for projection, and where a prospective purchaser of the projector may see a preview of the program material or other content which is contained in the projector. In this manner, the prospective purchaser will obtain an idea of the nature of the program material contained within the projector, or be able to determine the functionality of the projector and, to a greater or lesser extent, the quality of the projection.

BACKGROUND OF THE INVENTION

In general, the toy business may be said to be a very competitive business, so that not only the nature and appearance of a toy come into play in the first instance when it is being displayed for sale at retail stores, but in some instances even the function and quality of the toy when in use become important in the attempt to convince purchasers to buy any specific toy product. In general, the toys may be displayed in packaging or illustrated on the packaging; and in some circumstances the packaging may be interactive in that it may permit a prospective purchaser to press a button or squeeze the toy to hear a sound or observe some other function of the toy. However, there is a class of toy for which a greater interactivity between the packaged toy and the prospective purchaser is desirable.

That class of toy comprises toy projectors, which are typically inexpensive devices housed in plastic casings, and which apart from having a focusable lens may have few or no other function controls. Typically there may be a variety of program material which is loaded into the toy projector for viewing. The nature of such program material is beyond the scope of the present invention, and it is sufficient to say that typically the program material comprises cartridges having filmstrips or cartoons installed therein, filmstrips or other interactive electronic program material related to a book, or the like, whereby the pages of the book may be projected at the same time as they are being read or are intended to be read by the viewer, or further, still photographs or other images, or the like.

Once the toy projector has been purchased, it may be set upon a table or very often is hand held, whereby the program material contained in the projector may be viewed by pointing the projector at a wall, a screen, a door, or other appropriate and light reflecting surface. The intended projection length may range from 10 or 20 cm up to 2 to 5 meters or more. Accordingly, most such toy projectors are equipped with a focusable lens.

Allowing the purchaser to preview the projector display, and fully appreciate its display capabilities, would be desirable to ensure a successful sale.

Similarly, purchasers of any type of projector systems, including more sophisticated projectors in general, or alternatively, electronic digital projectors, would also benefit from being able to observe the display capabilities of the projector since these types of devices are currently typically sold in closed cases or boxes.

SUMMARY OF THE INVENTION

Accordingly, it is a principal advantage of the present invention to provide a display package that facilitates the viewing of the contents of a projector, without compromising the projector packaging.

It has therefore been determined that by providing the prospective purchaser with the opportunity to see at least a preview of the program material, there may be an increased likelihood that the purchaser will buy the projector. This is accomplished by providing the purchaser an opportunity to view a selected sample of video and/or audio content from the projector, such as one or several pages of a book or a few seconds of a cartoon, while the projector is still firmly secured within its packaging. Thus, the prospective purchaser may sample several different projectors before making a decision; or in the event that the prospective purchaser decides not to buy the projector, it remains in its packaging for preview viewing by another prospective purchaser.

This is accomplished by the provision of special packaging which presents a viewing area or screen upon which the program material may be projected without otherwise disturbing or destroying the packaging and the securement of the projector therewithin. Access is provided to the prospective purchaser so as to initiate a projection operation; and the viewing area is visible from outside the packaging. Moreover, provision may also be made for focusing a focusable lens if the projector is so equipped, so as to sharpen the image being projected onto the screen.

However, in other options, the focusable lens may be preset to an optimal focus for the package display, and locked in position using a locking mechanism until the projector is removed from the package.

The package design of the present invention is also important both to the retail seller and to the prospective purchaser in that, very often when such products are displayed in specialty stores or store departments, it is difficult to observe the projected image of the various devices under consideration, in order to compare the features of each product.

For example, with respect to toys and toy projectors, the prospective purchaser may be accompanied by a child or children either for whom the toy is intended or for whose friends the toy will be given as a gift by the child or children accompanying the prospective purchaser. Thus, the child or children may be given the option as to a choice of program material; and in any event, the child or children may be given the opportunity to personally interact with the toy projector and thus learn its function and operation.

In general, the projectors are electrically operated, being powered by batteries that are installed therein, and/or having an external power supply that is plugged into common household circuits. Alternatively, they may be operated and/or powered by interactive devices such as, for example, a crank handle. Indeed, such latter projectors afford a child who is using the projector to be able to pause and reverse the moving image as it is being projected.

Accordingly, in one aspect, the present invention provides, in combination, a projector and a package therefor;

wherein said projector has at least a start means for beginning a picture projection operation, a projection lens, and program material for projection from said lens;

wherein said package comprises:

means for securing said projector substantially in place within said package so as to be immovable therein when so secured;

front, rear, top, bottom, and end faces;

an opening in said front face to allow access to said start means of said projector; and an interior vertical wall positioned in the interior of said package at an acute angle with respect to said front face and extending between said front and rear faces in a position in front of said projection lens;

wherein said interior wall has at least a portion thereof with a light reflective surface, whereby images projected thereon from said projector are visible through an opening in said front face.

In a further aspect, the present invention also provides a projector package comprising means for securing said projector substantially in place within said package so as to be immovable therein when so secured;

front, rear, top, bottom, and end faces;

an opening in said front face to allow access to said start means of said projector; and an interior vertical wall positioned in the interior of said package at an acute angle with respect to said front face and extending between said front and rear faces in a position in front of said projection lens;

wherein said interior wall has at least a portion thereof with a light reflective surface, whereby images projected thereon from said projector are visible through an opening in said front face.

In one embodiment, the projector is preferably a toy projector using a film cartridge, and an optical lens system. In another embodiment, though, the projector is preferably a electronic digital system, which is adapted to display electronically generated digital images, or the like, through a optical lens system.

Still further, it has been noted that the focus mechanism in these types of packages can be moved from its optimal position so that the image is distorted. This may adversely affect the image observed by subsequent viewers. Accordingly, the present invention also provides a projector package wherein the image focus mechanism is hidden, or locked in place so that the viewer cannot modify the focus mechanism until after purchase or removal from the package.

DETAILED DESCRIPTION OF THE INVENTION

In the following discussion, a "toy projector" is described in detail. However, the skilled artisan will be aware that projectors or other display items, can be used in a wide variety of applications. Accordingly, while the following discussion is directed in particular to a toy projector, the skilled artisan would be aware that the present application is equally applicable in other applications, such as, for example, in the packaging of electronic digital projectors, or the like.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

Figure 1:
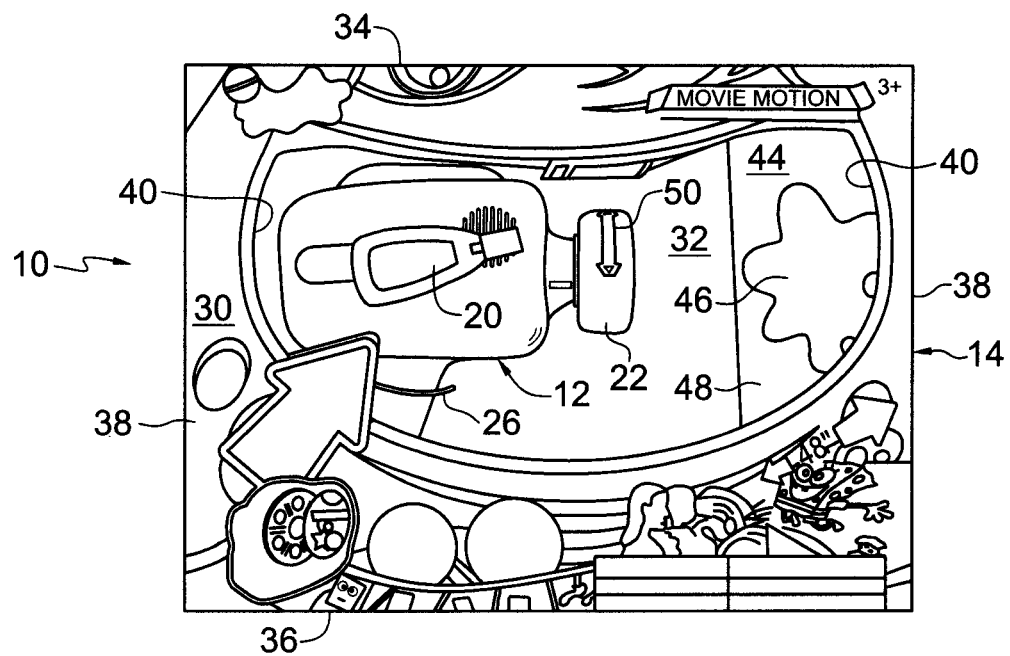
FIG. 1 shows a typical package having a projector therein, when seen from the front face thereof.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention. In particular, while a toy projector is shown, other embodiments of the invention are contemplated.

Turning first to FIG. 1, the combination of a toy projector 12 and its package 14 is shown generally at 10. For purposes of identification, the exterior faces of the package 14 are identified as follows: front face, 30; rear face, 32; top face, 34; bottom face, 36; and end faces, 38.

The toy projector 12 is provided with some kind of start means so that a picture projection operation by the toy projector 12 may be initiated. In the example shown in FIG. 1, that start means is a crank handle 20. If the projector were of a different type, then the crank handle 20 may be replaced by an electrical switch (not shown). The toy projector 12 is equipped with a projection lens 22, and program material for the toy projector will be understood to be contained within the body of the toy projector 12. The program material for this toy projector is typically contained on a filmstrip cartridge.

Means are provided to secure the toy projector 12 within the package 14. Such means may include twist ties such as those shown at 26. Of course other securing means such as hook and loop fasteners, suitable adhesives, snap fasteners or otherwise, may also be employed. In any event, the intent is to secure the toy projector 12 within the package 14 in such a manner that it is held substantially in place and is thus immovable within the package 14 even upon operation by a prospective purchaser of the crank handle 20 or other start means.

Because the operation of the toy projector 12 is to be previewed by a prospective purchaser, access to the toy projector must be provided, and this is typically by way of the provision of an opening 40 in the front face 30 of the package 14 as described in greater detail hereafter.

Figure 3:
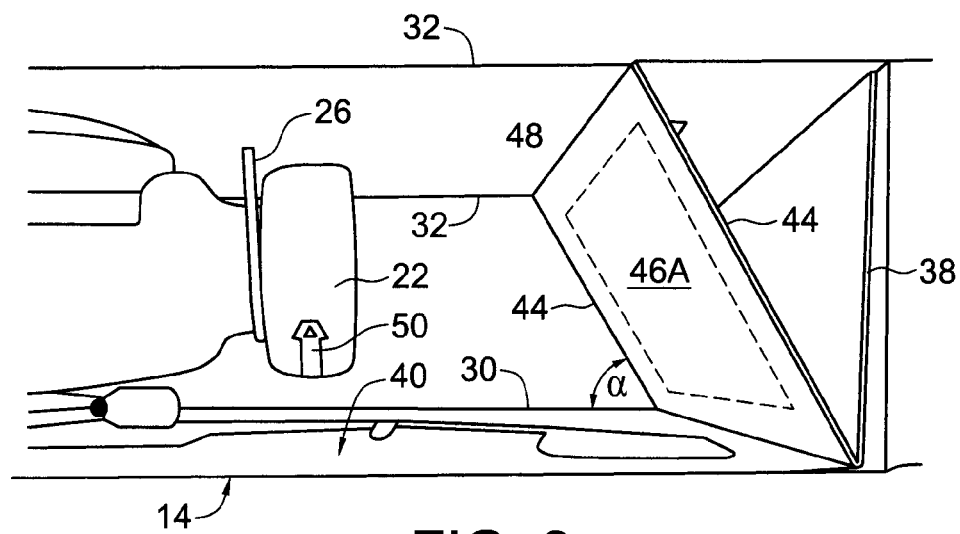
FIG. 3 is a view similar to FIG. 2, but in greater detail and showing an optional screen.

Moreover, because it is the purpose of the present invention to provide the prospective purchaser with a preview of the program material contained within the toy projector 12, it is important to provide a "projection screen" upon which the images may be projected. This is accomplished by the provision of an interior vertical wall 44 which is positioned within the interior of the package 14 at an acute angle (see FIG. 3) relative to the front face 30. The interior vertical wall 44 extends between the front face 30 and the rear face 32 of the package 14. It will be understood from examination of all of the figures that the placement of the interior vertical wall 44 is such that the image that is projected from the projection lens 22 onto a portion of the interior vertical wall 44 will be visible from outside the front face of the package 14, provided that a suitable opening is to be found in the front face 30 for that purpose.

Figure 2:
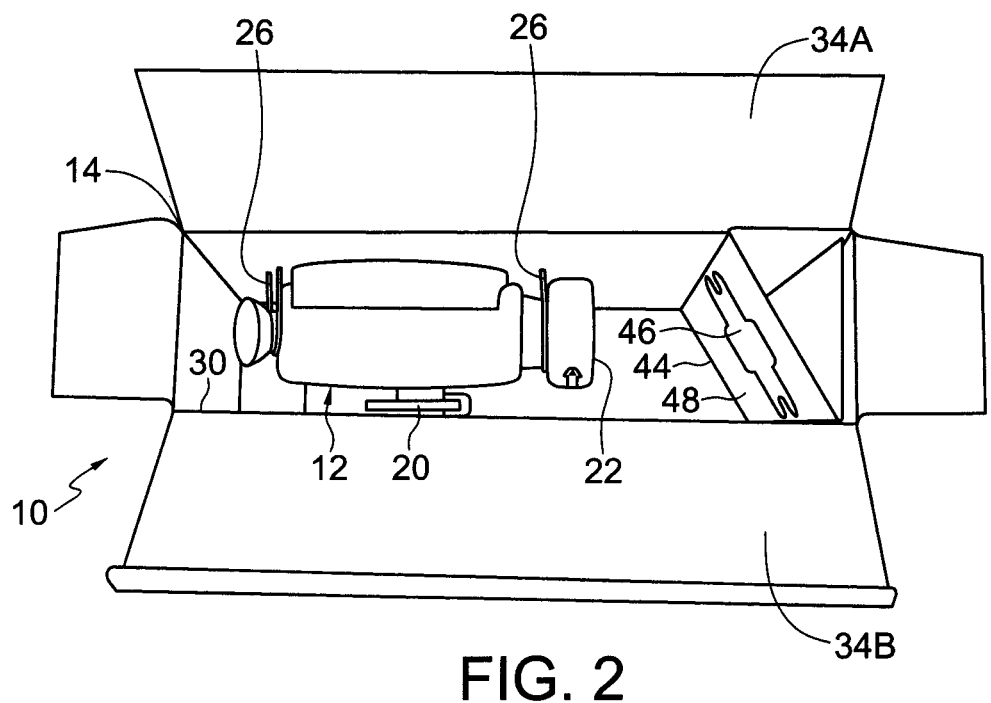
FIG. 2 shows the package of FIG. 1, with the top face being opened and seen from above.

Typically, only a portion 46 of the interior wall 44 is provided with a light reflective surface upon which the images are projected for viewing. In the example shown in FIGS. 1, 2, and 4, the portion 46 having the light reflective surface may be configured so as to suggest a cloud in the sky; or it may be configured in a more typical movie screen configuration such as shown at 46A in FIG. 3.

Typically, the light reflective surface 46 will comprise white cardboard or paper, being generally of the same material from which the package 14 is constructed. The area surrounding the portion 46 in any configuration of the interior vertical wall 44 is typically a contrasting color to white, and is generally not light reflecting to any degree.

Light reflective surface 46 is preferably located under top face 32, so as to provide some shading from overhead lighting, and thus, enhance the quality of the picture display.

The example of the combination of the toy projector 12 in the package 14, as it is shown at 10 in FIG. 1, has a single opening 40 in its front face 30. That opening 40 permits access to the start means 20, and to the focus adjustment 50 of the focusable projection lens 22. The same opening 40, in this case, also permits visibility of the light reflecting portion 46 of the interior vertical wall 44 for viewing the images projected thereupon. It will also be understood that because of the angle which is subtended by the interior vertical face 44 and the front face 30, the face of the vertical interior wall 44 may be viewed from anywhere that it is visible through the opening 40.

Of course, it will also be understood that more than a single opening may be provided in the front face 30, which in some respects may be dictated by the configuration of the toy projector 12 and the positioning of at least its start means 20. Thus, two, or even three, openings might be provided in the front face 30 in some cases to accommodate access to the start means 20, to the focusable lens 22, and to provide visibility of the interior vertical wall 44.

Moreover, while the opening may be provided so as to allow access to the projector, in other embodiments, the opening may be covered by a clear material, such as a clear plastic, in order to allow the user to view the projected image, but not necessarily, gain access to the projector itself. As such, the opening may be a visible opening to allow viewing only, without allowing access.

Figure 4:
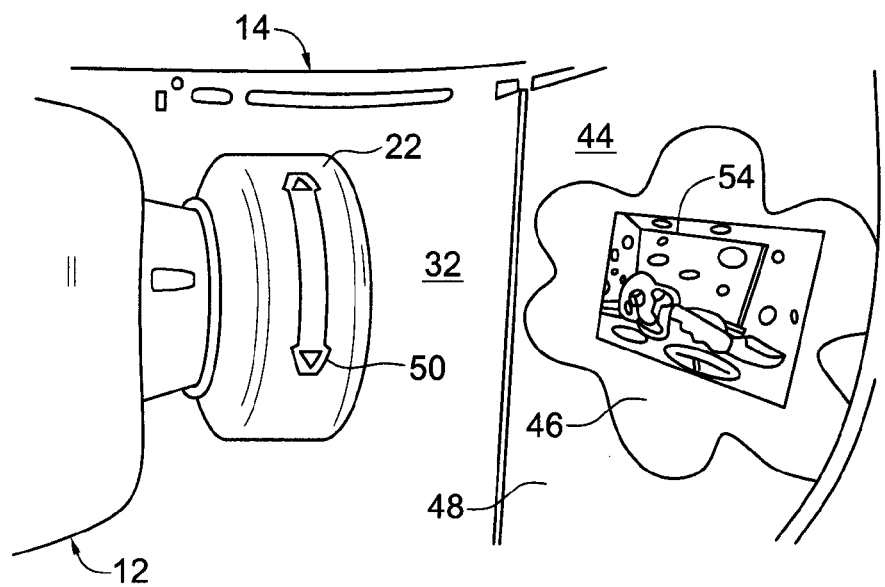
FIG. 4 is a view similar to FIG. 1, but in greater detail and showing an image being projected on the screen.

FIG. 4 shows the toy projector 12 in operation. Here, it will be seen that an image 54 is being projected onto the "screen" area of the reflective surface 46; and as noted that image may be viewed from anywhere that it is visible through an appropriate viewing opening in the front face 30.

It will also be understood, of course, that once the operation of the toy projector 12 has been initiated, that operation will preferably only proceed for a limited period of time. Thus, the picture projection operation will typically be terminated by means within the toy projector (not shown) after a predetermined period of time.

It will also be understood, that the embodiment described in FIGS. 1 to 4 shows the projector and reflective surface in an orientation wherein the projected image is viewed from the side of the package (or in a horizontal position). The reflective surface could alternatively be angled differently so as to allow the image to be viewed from the top of the package (in a vertical position). Other options are also possible.

Figure 5:
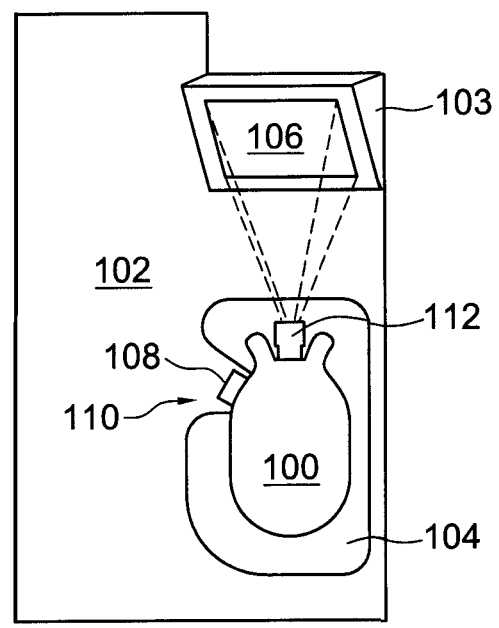
FIG. 5 is a front view of a second embodiment of the package of the present invention.

In FIG. 5, for example, a projector 100 is mounted in a vertical position on a flat surface 102, and the projector is essentially covered by a clear plastic cover 104. At one end of flat surface 102, a raised section 103 is provided which extends outwards, so as to act as a screen area 106. Access to the a display button 108 is provided by an opening 110 in cover 104. The focus ring 112 of projector 100 is covered by clear cover 104 so as to prevent changing the focus of the projector 100 until the projector has been removed from the package. The image is projected through clear cover 104 onto screen 106, and the user cannot modify the focus of projector 100.

Generally therefore, the skilled artisan will be aware that the projector and reflective surface can be positioned within the package, so as to achieve any desired combination of projector positioning and image display angle.

Figure 6:
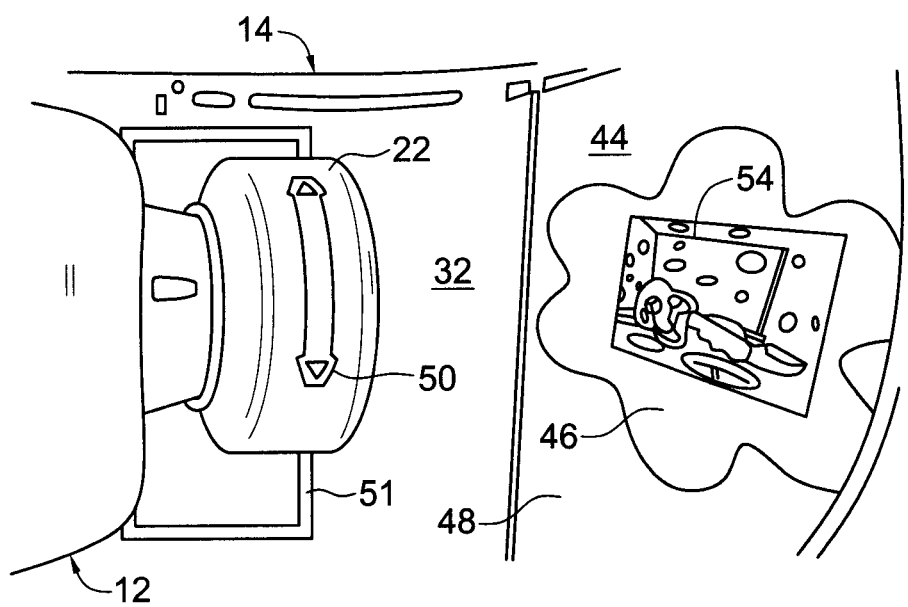
FIG. 6 is a front view of a projector in a package as in FIG. 1, containing a focus locking mechanism.

In FIG. 6, the same image as shown in FIG. 4 is provided but also includes a plastic locking ring 51 placed around the projector body, and around the focus adjustment 50 so as to prevent focus adjustment 50 from being moved. Once projector 12 is removed from the package, ring 51 can be removed, and the focus adjustment is free to operate.

It will now be seen that the present invention provides a robust yet economical packaging for a projector, whereby the operation of the projector may be seen, and the program material installed therein may be previewed, without disturbing the packaging or disassembling it in any way. In that way, retailers may be assured that prospective purchasers will be able to fully appreciate the value and function of the projector without having to provide a display sample, and with much less concern for there being a return for purposes of a non-functioning projector or for failure to understand the function and operation thereof.

Thus, it is apparent that there has been provided, in accordance with the present invention, a packaging arrangement for projectors which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Further, the invention illustratively disclosed herein suitably may be practiced in the absence of any element which is not specifically disclosed herein.

Moreover, the words "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively. Additionally, unless otherwise specifically noted, all of the features described herein may be combined with any of the above aspects, in any combination.

Also, while this discussion has addressed prior art known to the inventor, it is not an admission that all art discussed is citable against the present application.

We claim:

1. In combination, a projector and a package therefor;
    wherein said projector has at least a start means for beginning a picture projection operation, a projection lens, and program material for projection from said lens;
    wherein said package comprises:
        means for securing said projector substantially in place within said package so as to be immovable therein when so secured; front, rear, top, bottom, and end faces; an opening in said front face to allow access to said start means of said projector; and an immovable fixed interior vertical wall positioned in the interior of said package adjacent one of said end faces and further fixed at an acute angle with respect to said front face and wherein the fixed interior vertical wall extends between said front and rear faces in a position in front of said projection lens, and wherein said fixed interior vertical wall has at least a portion thereof with a light reflective surface, whereby images projected thereon from said projector are visible through an opening in said front face, and wherein once the picture projection operation of said projector has been initiated, said projector includes a software component configured that said picture projection operation will be terminated following a predetermined period of time.

2. The combination of claim 1, wherein there is a single opening in said front face of said package through which said start means of said projector is accessible and said images projected on said light reflective surface are visible.

3. The combination of claim 1, wherein said projection lens is focusable so as to adjust the focus of said lens when images are projected therefrom onto said light reflective surface.

4. The combination of claim 3, wherein there is a single opening in said front face of said package through which said start means of said projector and said focusable projection lens are accessible, and through which said images projected on said light reflective surface are visible.

5. The combination of claim 1, wherein said start means of said projector is accessible through a first opening in said front face of said package, and wherein said images projected on said light reflective surface are visible through a second opening in said front face of said package.

6. The combination of claim 5, wherein said projection lens is focusable and is accessible through a third opening in said front face of said package so as to adjust the focus of said lens for viewing images projected therefrom onto said light reflective surface.

7. The combination of claim 1, wherein said light reflective surface comprises white cardboard or paper.

8. The combination of claim 7, wherein when said light reflective surface comprises only a portion of said interior vertical wall, said portion is surrounded by a surface, or a contrasting color to white, which is substantially not light reflecting.

9. The combination of claim 1 wherein said projector is a toy projector.

10. The combination of claim 1 wherein said projector is an electronic digital projector.

11. The combination of claim 3 wherein said projection lens is pre-set to an optimal focus for the package display, and locked in position using a locking mechanism until the projector is removed from the package.

12. In combination, a projector and a package comprising:
said projector having a projection lens, program material for projection from said lens, and a packaging activation switch, said packaging activation switch configured to project the program material from said lens when activated, and said projector includes a software component configured to terminate the projection following a predetermined period of time after the packaging activation switch is activated; and
said package having in a point of sale packaged display:
front, rear, top, bottom, and end faces creating an internal space configured to receive said projector in a packaged configuration;
an opening in said front face to allow access to said packaging activation switch of said projector; and
a light reflective surface positioned in the internal space at an immovable fixed angle with respect to said front face and extending between said front and rear faces in a position facing said projection lens, whereby images projected thereon from said projector are visible through said front face.

* * * * *